Sept. 7, 1965   R. C. NELSON ETAL   3,204,660
FLOW REGULATING MEANS FOR VALVES
Filed Oct. 5, 1962

INVENTORS:
RICHARD C. NELSON,
JOHANNES STEENEKEN,
BY

Attorney.

United States Patent Office 3,204,660
Patented Sept. 7, 1965

3,204,660
FLOW REGULATING MEANS FOR VALVES
Richard C. Nelson, Los Angeles, and Johannes Steeneken, Manhattan Beach, Calif., assignors to The Garrett Corporation, Los Angeles, Calif., a corporation of California
Filed Oct. 5, 1962, Ser. No. 228,658
4 Claims. (Cl. 137—505.38)

This invention relates generally to valves and particularly to an improved flow regulating valve mechanism.

The improved valve mechanism of this invention is especially suitable for use in one particular type of valve, namely a diaphragm actuated, pressure regulating valve. For this reason, the valve mechanism is disclosed herein with reference to such a pressure regulating valve. It will become readily evident as the description proceeds, however, that the present valve mechanism may be used to advantage in other kinds of valves. Accordingly, it should be understood as the description proceeds that the disclosed pressure regulating valve is intended to illustrate only one of the many applications of the present valve mechanism.

Pressure regulating valves of the general type disclosed herein are well known in the art and comprise a valve body containing a flexible diaphragm, one side of which is exposed to a predetermined reference pressure and the other side of which is exposed to the pressure at the valve outlet. Operatively connected with this diaphragm is a valve mechanism which regulates fluid flow from the valve inlet to the valve outlet upon movement or deflection of the diaphragm in response to an unbalance of the pressures on the diaphragm. The reference pressure to which the diaphragm is exposed is made such that the diaphragm remains balanced in its neutral position, wherein the valve is closed, when a given pressure exists at the valve outlet. If this outlet pressure drops, the diaphragm becomes unbalanced and flexes, thereby opening the valve to permit additional fluid to flow to the valve outlet. As the outlet pressure returns to its initial level, the diaphragm is gradually restored to balance in its neutral position, thus reclosing the valve.

In many existing pressure regulating valves of this kind, and in the present pressure regulating valve, the operative connection between the pressure responsive valve diaphragm and the flow regulating valve mechanism is a valve stem which moves with the diaphragm to position the flow controlling elements of the mechanism. A majority of these existing valves are deficient in that the valve stem is exposed to the inlet pressure of the valve. As a result, a seal between the valve stem and valve body is required to prevent leakage of high pressure fluid past the valve stem from the valve inlet to the diaphragm. Such fluid leakage, of course, would not only adversely effect the pressure regulating action of a valve of this kind but further, and more important, the fluid pressure on the diaphragm could increase sufficiently, as a result of such leakage, to rupture the diaphragm. This possibility of diaphragm rupture is obviously undesirable and, in many cases, presents a serious safety hazard, especially when corrosive, combustible, or other dangerous fluids are being handled.

Moreover, pressure regulating valves are often required to operate at high pressures that prohibit the use of conventional valve stem seals, such as O-rings, or even render it impossible to devise any kind of effective valve stem seal whatsoever. Also, of course, seals of all kinds are prone to wear, deterioration, and other undesirable effects which can be avoided only by eliminating the need for a valve stem seal.

A general object of this invention is to provide an improved valve mechanism of the character described.

An important object of the invention is to provide an improved valve mechanism which is particularly adapted for use in a diaphragm actuated pressure regulating valve and which eliminates the valve stem seal required in conventional pressure regulating valves of this kind.

Another highly important object of the invention is to provide an improved valve mechanism which is capable of operation at very high fluid pressures.

A further object of the invention is to provide an improved valve mechanism which is simple in construction, economical to manufacture, and otherwise ideally adapted to its intended purposes.

Briefly, the foregoing and other objects of the invention are attained by providing a valve mechanism including a valve body having a fluid inlet, a fluid outlet, an internal chamber, and a fluid passage communicating said inlet to said outlet through at least one port in the chamber wall. Movable in this chamber is a cam having a sloping surface between which, and said port, is confined to a ball. The cam surface is inclined to the direction line of cam movement and operates to progressively cam the ball into sealing contact with a valve seat about the port upon movement of the cam in one direction and to release the ball for progressive movement out of contact with the valve seat upon movement of the cam in the opposite direction, whereby to regulate fluid flow through the port.

In the illustrated embodiment of the invention, the cam is part of a valve stem which is connected to the diaphragm of a pressure regulating valve of the kind described earlier, whereby the cam is moved by flexing of the diaphragm. The cam and valve stem are located on the downstream side of the valve ball and are thus isolated from the valve inlet pressure. Accordingly, the deficiencies, discussed earlier, of the prior regulating valves of this kind are corrected.

According to the preferred practice of the invention, the cam is conically tapered and the present improved valve mechanism is provided with a multiplicity, preferably three, of ports and valve balls which are uniformly spaced about the cam to balance the lateral forces or side thrust exerted on the cam by the balls when the latter are urged against their seats by the cam. This multiple ball arrangement is especially advantageous and important in the case of high valve inlet pressure since such an arrangement eliminates the need for accurately guiding the stem in the valve body to resist the large unseating forces created on the balls by high inlet pressure, and, in general results in an overall superior, less complex and costly valve.

A diaphragm actuated pressure regulating valve embodying the present improved valve mechanism will now be described by reference to the attached drawings wherein.

Figure 1:
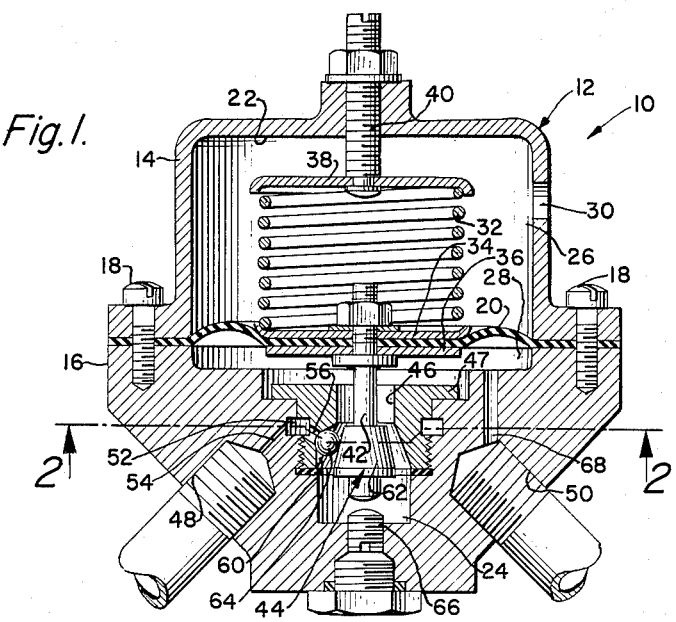
FIG. 1 is a longitudinal section through the pressure regulating valve.

The pressure regulating valve 10 illustrated in these drawings comprises a body 12 having two flanged parts 14 and 16 joined at their flanges by bolts 18. Clamped about its periphery between the flanges of parts 14 and 16 is a flexible diaphragm 20. Within the valve body 12 are two coaxial, communicating chambers 22 and 24. Diaphragm 20 divides the first chamber 22 into first and second fluid spaces 26 and 28.

Fluid space 26 communicates with a predetermined reference pressure. In the valve illustrated, this reference pressure is ambient atmospheric pressure to which space 26 communicates via a vent opening 30 in the wall of body part 14. The upper surface of diaphragm 20 is thus exposed to the reference atmospheric pressure which acts to deflect the diaphragm downwardly, as it is viewed in the drawings.

The upper surface of the diaphragm is also exposed to a second reference spring pressure exerted by a helical compression spring 32 situated in the fluid space 26. The center of the diaphragm is clamped between a pair of metal discs 34 and 36, the upper one 34 of which seats the lower end of spring 32. The upper end of spring 32 seats against a metal disc 38 carried on the end of an adjusting screw 40 threaded in the body part 14. The net reference pressure on the upper surface of diaphragm 20, then, equals the sum of the reference atmospheric pressure and the reference spring pressure, the net pressure being adjustable by adjustment of screw 40.

The diaphragm discs 34 and 36 are clamped together by a valve stem 42 which extends coaxially from the diaphragm into the second valve body chamber 24. On the lower end of this stem, within the chamber 24, is a cone-shaped cam 44. The stem extends through the central opening 46 in an annular insert 47 which is threaded in and defines part of the wall of chamber 24.

Figure 2:
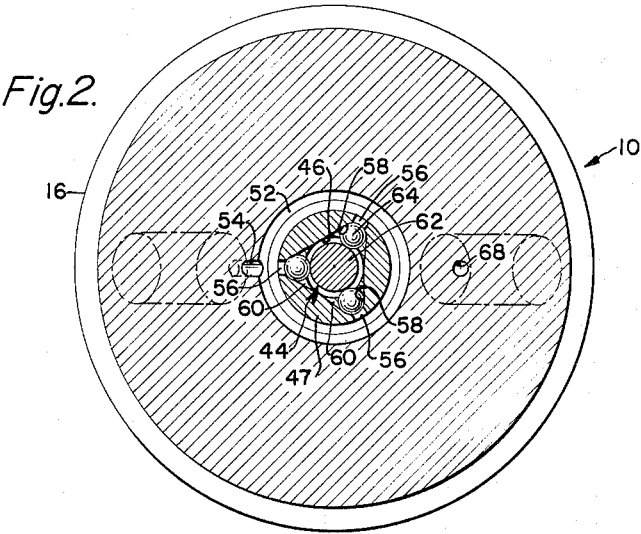
FIG. 2 is a section taken on line 2—2 in FIG. 1.

Valve body 12 has a fluid inlet opening 48 and a fluid outlet opening 50. Valve body part 16 and insert 47 are provided with confronting annular grooves defining an annular manifold passage 52 encircling the chamber 24 and communicating with the inlet 48 via an inlet passage 54 in part 16. Manifold passage 52, in turn, communicates with chamber 24 through a multiplicity of radial ports 56 opening through the cylindrical wall of chamber 24. Preferably, these ports are three in number and uniformly spaced about the chamber, as may be best observed in FIG. 2. About each port is an annular valve seat 58.

The internal wall of insert 47 tapers inwardly in the vicinity of ports 56, as shown, and is formed with an axial slot or groove 60 in line with, and slightly narrower than, the diameter of each port 56.

Positioned between each port 56 and the confronting conically tapered side surface 62 of cam 44 is a ball 64. Each ball is confined or caged by the side and bottom walls of their respective insert grooves 60 (the bottom walls of which grooves contain the ports 56 and valve seats 58) and the cam surface 62.

It is evident from the drawings that the cam surface 62 progressively cams the balls 64 into contact with their respective valve seats 58, to progressively close the ports 56, upon upward axial movement of cam 44 in chamber 24. The balls are released for progressive movement out of contact with their respective valve seats, to progressively open the ports 56, upon downward movement of the cam 44 in the chamber 24. Threaded in the lower body part 16 is an adjustable stop screw 66 engageable with the lower end of valve stem 42 to limit opening movement thereof to a position in which the ports 56 have a desired maximum opening or to a limiting position in which the balls 64 remain caged between the cam 44 and the wall of chamber 24.

Valve outlet 50 communicates with fluid space 28 below the diaphragm 20 via an outlet passage 68. The latter space, in turn, communicates with chamber 24 via the central opening 46 in insert 47. It is evident, therefore, that the valve body 12 has a fluid passage, comprising inlet passage 54, chamber 24, fluid space 28, and outlet passage 68, which communicates the valve inlet 48 to the valve outlet 50 through ports 56 in the wall of chamber 24 and that flow through these ports is regulated by the cam 44 through the intermediate valving action of the balls 64.

In operation of the illustrated pressure regulating valve, the pressure of spring 32 on the upper surface of diaphragm 20 is adjusted, by adjustment of screw 40, so that the diaphragm is balanced (i.e., the net spring and fluid pressure differential across the diaphragm is zero) in its neutral position, illustrated, when a given pressure exists in the valve outlet 50 and, therefore, in the lower fluid space 28. In this position, the cam retains the valve balls 64 in sealing contact with their respective valve seats 58 to close the ports 56 and thereby cut off fluid flow through the valve. When the fluid utilizing device (not shown) to which the valve outlet 50 is connected is operated, the pressure at the valve outlet, and therefore the pressure in fluid space 28 to which the lower surface of diaphragm 20 is exposed, drops. The diaphragm becomes unbalanced in a downward direction as a consequence of this outlet pressure drop and is deflected downwardly by the net reference pressure on the upper diaphragm surface.

Downward deflection of the diaphragm moves the valve stem 42 and its cam 44 downwardly, thereby progressively opening the ports 56 to permit additional fluid to flow from the fluid pressure supply (not shown) connected to the valve inlet 48, through the valve, to the valve outlet. The valve remains open so long as the outlet pressure remains below the level for which the valve is set. When the outlet pressure returns to this preset pressure, the diaphragm is returned to the balance in its neutral position, thereby moving the cam 44 upwardly to again cam the valve balls 64 to their closed position of sealing contact with their respective valve seats 58 and cutoff fluid flow through the valve.

Attention is directed to the uniform spacing of the three valve balls 64 about the cam 44. This arrangement has the unique advantage that the forces of lateral thrust exerted on the cam by the valve balls 56, when the latter are urged into contact with their valve seats 58 by the cam, are balanced. As a consequence there is no resultant side thrust on the cam or its valve stem 42 which would tend to laterally deflect the stem and thereby permit the balls to unseat. Accordingly, it is unnecessary to guide the valve stem in the valve body. In the illustrated valve, for example, it will be observed that the insert opening 46 through which the valve stem extends is appreciably larger than the stem to permit unrestricted fluid flow therethrough, the valve stem being supported only by the diaphragm 20 and the balanced forces exerted by the valve balls. This balance of forces on the cam, of course, exists regardless of the inlet pressure of the valve. Accordingly, the valve is capable of operating at extremely high inlet pressures with the stem supported solely by the flexible diaphragm and the valve balls.

It will also be observed that the stem is exposed to the outlet pressure of the valve rather than to the inlet pressure. As a consequence, there is no problem of fluid leakage past the stem, as discussed earlier, and hence no need to provide a troublesome stem seal.

It is evident from the preceding description that the present improved valve mechanism comprises the elements in the lower half of the pressure regulating valve in FIG. 1, to wit, the valve body 16 with the fluid inlet 48 and fluid outlet 50, the communicating passage therebetween including the ports 56 which open into the chamber 24, the valve stem 42 with its cam 44, and the valve balls 64. Obviously this valve mechanism can be embodied in other types of valves than diaphragm operated, pressure regulating valves of the kind illustrated. The valve stem 42 could be hydraulically, electrically, or manually operated for example.

Accordingly it will be understood that numerous modifications in the design arrangement of parts and instrumentalities of the invention are possible within its spirit and scope.

We claim:
1. A valve mechanism comprising:
   a body having a fluid inlet, a fluid outlet, an internal chamber with a central axis and a wall about said central axis, a fluid passage communicating said inlet to said outlet through at least three ports in said chamber wall, and a valve seat about each port;
   a cam in said chamber, said cam having an axis substantially parallel to said central axis;

means mounting said cam on said body for axial movement along said central axis and for lateral movement toward and away from said valve seats;

balls confined between said cam and said valve seats, respectively;

said cam including means for camming said balls into seating contact with said valve seats upon axial movement of said cam in one direction to a given position and releasing said balls for movement out of contact with said valve seats upon axial movement of said cam in the opposite direction;

said valve seats being angularly spaced about said cam in such manner that said cam axis lies within the geometrical figure defined by straight lines interconnecting the points of contact of the balls with the cam whereby said balls laterally confine and position said cam during axial movement of the cam to and from said given position;

means for axially moving said cam; and said cam being laterally positioned relative to said valve seats solely by said balls, thereby to minimize the resistance to axial movement of the cam and assure proper seating contact of each ball with its valve seat when said cam is in said given position thereof.

2. A valve mechanism comprising:

a body having a fluid inlet, a fluid outlet, an internal chamber with a central axis and a wall about said central axis, a fluid passage communicating said inlet to said outlet through three ports in said chamber wall, and a valve seat about each port;

a cone-shaped cam in said chamber approximately centered on said axis;

means mounting said cam on said body for axial movement along said axis and for lateral movement toward and away from said valve seats;

balls confined between the conical surface of said cam and said valve seats, respectively;

said conical surface being axially tapered to cam said balls into seating contact with said valve seats upon axial movement of said cam in one direction to a given position and release said balls for movement out of contact with said valve seats upon axial movement of said cam in the opposite direction;

said valve seats being angularly spaced about said cam in such manner that said balls laterally confine and position said cam during axial movement of the cam to and from said given position;

means for axially moving said cam; and said cam being laterally positioned relative to said valve seats solely by said balls, thereby to minimize the resistance to axial movement of the cam and assure proper seating contact of each ball with its valve seat when said cam is in said given position thereof.

3. A pressure regulating valve comprising:

a body having first and second communicating interior chambers;

a flexible pressure wall in said first chamber and sealed about its edge to the wall of said first chamber;

a valve stem fixed at one end to said pressure wall and having its other end extending into said second chamber for axial movement in said second chamber in response to movement of said pressure wall;

a cam on said other end of said stem within said second chamber, said cam having an axis substantially parallel to the axis of said valve stem;

said second chamber having a wall extending about and radially spaced from said cam;

there being a fluid passage communicating a fluid inlet in said body to a fluid outlet in the body through at least three ports in said wall of said second chamber;

a valve seat about each port;

said other end of said stem and said cam being laterally movable toward and away from said valve seats;

balls confined between said cam and said valve seats, respectively;

said cam including means for camming said balls into seating contract with said valve seats upon axial movement of said cam in one direction to a given position and releasing said balls for movement out of contact with said valve seats upon axial movement of said cam in the opposite direction;

said valve seats being angularly spaced about said cam in such manner that said cam axis lies within the geometrical figure defined by straight lines interconnecting the points of contact of the balls with the cam whereby said balls laterally confine and position said cam during axial movement of the cam to and from said given position; and said cam being laterally positioned relative to said valve seats solely by said balls, thereby to minimize the resistance to axial movement of the cam and assure proper seating contact of each ball with its valve seat when said cam is in said given position thereof.

4. A pressure regulating valve comprising:

a body having first and second communicating interior chambers;

a flexible presure wall in said first chamber and sealed about its edge to the wall of said first chamber;

a valve stem fixed at one end to said pressure wall and having its other end extending into said second chamber for axial movement in said second chamber in response to movement of said pressure wall;

a cone-shaped cam coaxially mounted on said other end of said stem within said second chamber;

said second chamber having a wall extending about and radially spaced from said cam;

there being a fluid passage communicating a fluid inlet in said body to a fluid outlet in the body through three ports in said wall of said second chamber;

a valve seat about each port;

said other end of said stem and said cam being laterally movable toward and away from said valve seats;

balls confined between the conical surface of said cam and said valve seats, respectively;

said conical surface being axially tapered to cam said balls into seating contact with said valve seats upon axial movement of said cam in one direction to a given position and release said balls for movement out of contact with said valve seats upon axial movement of said cam in the opposite direction;

said valve seats being angularly spaced about said cam in such manner that said balls laterally confine and position said cam during axial movement of the cam to and from said given position; and said cam being laterally positioned relative to said valve seats solely by said balls, thereby to minimize the resistance to axial movement of the cam and assure proper seating contact of each ball with its valve seat when said cam is in said axial position thereof.

References Cited by the Examiner

UNITED STATES PATENTS

| | | | |
|---|---|---|---|
| 1,725,280 | 8/29 | Kiefer. | |
| 1,816,431 | 7/31 | Helf | 137—601 XR |
| 2,225,690 | 12/40 | Ewald | 137—505.44 XR |
| 2,729,826 | 1/56 | Dowain | 251—251 XR |
| 2,923,315 | 2/60 | Bletcher | 137—454.6 |

ISADOR WEIL, *Primary Examiner.*